United States Patent Office 3,346,322
Patented Oct. 10, 1967

3,346,322
STABLE HIGHLY CONCENTRATED SOLUTIONS
OF BASIC DYES
Helmut Finkenauer, Walter Seibert, Karl Kohl, Eberhard Luecke, and Fritz Schubert, Ludwigshafen (Rhine), Germany, assignors to Badische Anilin- & Soda-Fabrik Aktiengesellschaft, Ludwigshafen (Rhine), Germany
No Drawing. Filed Mar. 25, 1963, Ser. No. 267,836
Claims priority, application Germany, Mar. 29, 1962, B 66,580; Feb. 16, 1963, B 70,768
9 Claims. (Cl. 8—79)

This invention relates to stable highly concentrated solutions of carboxylic acid salts of basic dyes.

Basic dyes of the diarylmethane and triarylmethane series and also basic azo, azomethine or methine dyes are used extensively in the form of aqueous solutions in the paper, textile and leather industries. Finely ground dyes are usually used for the production of these solutions. This method however has considerable disadvantages. For example when, through unsuitable storage, the finely ground dry powder is partly or wholly caked to lumps by the action of moisture or heat, difficulty is encountered in dissolving it. Moreover weighing out, transferring or filling the powdered, water-soluble, extremely intensely coloring dyes is attended by unpleasant formation of dust. During dissolution of the dyes and when solutions of the dyes are stirred strong frothing often takes place and this may lead to the solutions frothing over with consequent contamination and loss.

It has been proposed to add certain substances to avoid the dusting of finely ground dyes and the frothing during preparation of the solutions. Many wetting agents have also been recommended to promote rapid and complete dissolution of dye powders. All these additives merely diminish the said disadvantages without wholly obviating them.

The disadvantages of finely ground basic dyes in use may be avoided by using highly concentrated stock solutions supplied by dye manufacturers. Very highly concentrated aqueous solutions could however not hitherto be prepared. The salts of basic dyes generally used, in many cases the hydrochlorides, will dissolve only in relatively low concentrations in water or other suitable liquids, especially at room temperature. The solutions thus obtained have no practical importance because of the high proportion of solvent, the high cost of transportation and packaging entailed and the risk of freezing or drying up.

It is the object of the present invention to provide stable highly concentrated solutions of basic dyes which are stable to moderate frost.

This object is achieved according to this invention by solutions of salts of basic dyes with water-soluble carboxylic acids in solvents which are liquid at room temperature and are miscible in all proportions with water, the said solvents being selected from polyhydric alcohols or their ethers or esters, polyethers, amides, lactones, nitriles, dimethyl sulfoxide, tetrahydrofuran or dioxane.

The solutions may contain an excess of the water-soluble carboxylic acids, but preferably not more than a single stoichiometric excess with reference to the dye. (This amount is sufficient to prevent hydrolysis of the carboxylic acid salt.) The solutions may also contain water, advantageously in a ratio of solvent to water of 10:1 to 1:1, preferably about 1:1.

The day may be contained in the solution to the extent for example of 20 to 80% by weight. In some cases it is possible to prepare solutions containing up to 90% of dye, but for technical reasons, particularly in the case of solutions of diarylmethane and triarylmethane dyes, 50 to 80% by weight is preferred. Solutions of cyanine dyes according to this invention preferably contain from 30 to 50% by weight of dye.

The term "basic dye" refers to dye salts whose chromogenic component is a dye cation. Examples of such dyes are dyes of the diarylmethane, triarylmethane, pyronine, rhodamine, acridine, safranine, oxazine, quinoline and thiazole dye series, and also basic azo dyes, azomethine dyes, polymethine dyes or azapolymethine dyes. For the production of solutions according to this invention, the diarylmethane, triarylmethane and diazapolymethine dyes are especially suitable, and of these the former are preferred.

Diarylmethane and triarylmethane dyes include dyes of the diarylmethane and triarylmethane series which are free from sulfonic acid groups and which are capable of forming salts.

The following basic dyes which are used in the form of their carboxylic acid salts for the production of the solutions according to this invention are given as examples:

| | Colour Index No. |
|---|---|
| Methyl Violet | 42535 |
| Crystal Violet | 42555 |
| Victoria Blue B | 44045 |
| Victoria Blue R | 44040 |
| Ethyl Violet | 42600 |
| Capri Blue G | 51000 |
| Cresyl Blue 2BS | 51010 |
| Fast Grey N | (1) |
| Fast New Blue 3R | 51175 |
| Fast Black | (2) |
| Chrysoidine B | 11270 |
| Vesuvin BA | 21000 |
| Safranine T | 50240 |
| Thioflavine | 49005 |
| Rhodamine B | 45170 |
| Euchrysin 3R | 46005 |
| Induline Scarlet | 50080 |
| New Fuchsine | 42520 |
| Night Blue | 42515 |
| Nile Blue | 51180 |
| Nile Blue 2B | 51185 |
| Rhoduline Blue 2G | 50220 |

[1] Obtainable by condensation of p-nitrosodimethylaniline hydrochloride with aniline in the presence of hydrochloric acid.
[2] German patent specification No. 50,612, example.

Examples of carboxylic acids are monocarboxylic acids and dicarboxylic acids, the latter preferably having more than two carbon atoms, particularly aliphatic monocarboxylic and dicarboxylic acids. It is preferred to use low molecular weight liquid carboxylic acids, for example having less than seven carbon atoms, but solid carboxylic acids may also be used for the salt formation provided they are soluble in water. Water-soluble hydroxycarboxylic acids are also suitable. Specific examples of water-soluble carboxylic acids are formic acid, acetic acid, propionic acid, maleic acid and lactic acid.

Examples of preferred water-soluble polyhydric alcohols and their ethers and esters which are liquid at room temperature are dihydric and trihydric alcohols and their low molecular weight ethers or esters, for example ethylene glycol, diethylene glycol monoethyl ether, diethylene glycol monobutyl ether, triethylene glycol monobutyl ether, triethylene glycol, dipropylene glycol, ethylene glycol monomethyl ether, ethylene glycol monoethyl ether, 1,2-propylene glycol, ethylene glycol monopropyl ether, ethylene glycol monobutyl ether, diethylene glycol, diethylene glycol monomethyl ether, diethylene glycol monopropyl ether, ethylene glycol monoacetate, methyl glycol acetate and 1,4-butanediol.

The following are examples of amides (including cyclic amides), lactones and nitriles which are suitable for the preparation of the solutions according to this invention: formamide, dimethylformamide, N - methylpyrrolidone, butyrolactone and acetonitrile.

Water-soluble polyethers are the polymerization products of alkylene oxides whose terminal groups can be etherified or esterified such as polyethylene condensation products having molecular weights for example of 191 or 281.

Among the solvents mentioned, the following are preferred: ethylene glycol, diethylene glycol monoethyl ether, dipropylene glycol, propylene glycol, formamide and dimethylformamide.

The solvents may be used unmixed, or a mixture of solvents may be used, or the solvent may be mixed with water.

The procedure for the preparation of the solutions may be for example that the said salts of the basic dyes with water-soluble carboxylic acids are dissolved in the said water-soluble solvents at room temperature or elevated temperature. It is advantageous however to dissolve the carbinol base, for example of a basic diarylmethane dye or triarylmethane dye, which may still be water-wet, in a mixture of a water-soluble carboxylic acid, which may be used in the stoichiometric amount or a multiple excess, for example 1.5 to 2 times excess, and a solvent of the said type. The dye base may also first be stirred with the carboxylic acid and the solvent then added.

A small amount, for example 0.1 to 3%, of an antifoaming agent may be added to the resultant solutions if desired.

Pure dyes or dyes which have already been shaded may be used for the preparation of the solutions or solutions of the dyes may be mixed or shaded after they have been prepared.

The solutions according to this invention contain the dyes in very high concentrations, for example 20 to 80%, in some cases up to 90%, and preferably 50 to 80% by weight and, in spite of their high proportion of dye, have the nature of true solutions. Although the solutions according to this invention are super-saturated, they remain liquid at temperatures far below freezing point and the dissolved dyes do not crystallize out. There is furthermore no falling off of the concentration upon prolonged storage of the solution.

The solutions according to this invention are miscible in all proportions with water or, if desired, also with suitable organic solvents. Solutions diluted with water have a weaker acid reaction than aqueous solutions having the same content of the hydrochlorides of the basic dyes conventionally used. The nature of the highly concentrated solutions obtainable in the manner described permits in exact volumetric dosage of the dyes.

In addition to the production of dye solutions for paper or textile fibers, the highly concentrated dye solutions are also suitable for other purposes, for example for the production of non-drying inks for self-recording indicating instruments. For this purpose it is merely necessary to dilute the stock solution to the desired final color strength by adding for example ethylene glycol. This method of preparing inks is much simpler than that of British patent specification No. 865,065. Moreover practically any desired shade of color of the inks may be obtained in this way, whereas the poor solubility of most dye salts with inorganic acids in ethylene glycol does not permit this.

Furthermore the solutions may be used for the production of printing inks for stamp pads and for typewriter ribbons.

The invention is further illustrated by the following examples in which parts are by weight. The examples show how the said dye solutions may be made. The references to C. I. Nos. are to Colour Index, 2nd edition, volume 3.

EXAMPLE 1

100 parts of the carbinol base of Methyl Violet (C.I. No. 42535) is added to a mixture of 60 parts of glacial acetic acid and 20 parts of diethylene glycol monobutyl ether while stirring and the mixture is heated at 50° to 70° C. for half an hour to an hour. A viscous solution of the acetic acid salt of Methyl Violet is thus obtained which is still capable of being poured at low temperature, for example −13° C. 125 parts of this solution has the same shade and color strength as 100 parts of the hydrochloric acid salt of Methyl Violet (C.I. No. 42535) conventionally used in solid form.

EXAMPLE 2

200 parts of of the carbinol base of Methyl Violet (C.I. No. 42535) is introduced into a mixture of 120 parts of formic acid and 40 parts of the monobutyl ether of diethylene glycol while stirring. A highly concentrated solution of methyl violet formate is thus formed which still has a low viscosity at −5° C. 125 parts thereof has the same color strength as 100 parts of solid Methyl Violet hydrochloride.

EXAMPLE 3

200 parts of Methyl Violet base (C.I. No. 42535) is introduced into a mixture of 120 parts of propionic acid and 40 parts of diethylene glycol monobutyl ether at 70° C. and a stable highly concentrated solution of methyl violet propionate is obtained of which 125 parts has the same color strength as 100 parts of the usual solid Methyl Violet hydrochloride.

EXAMPLE 4

200 parts of Methyl Violet base (C.I. No. 42535) is stirred into a mixture of 104 parts of diethylene glycol monobutyl ether and 76 parts of maleic acid at 50° C. and the whole then heated for two to three hours at 70° C. A highly concentrated stable solution of the maleate of the dye is formed of which 140 parts has the color strength of 100 parts of Methyl Violet.

EXAMPLE 5

400 parts of freshly precipitated Methyl Violet base (C.I. No. 42535) is introduced into a mixture of 80 parts of glacial acetic acid and 80 parts of triethylene glycol monopropyl ether and stirred for an hour at 70° C. A liquid is thus formed which does not solidify even at low temperatures and undergoes no change upon prolonged storage. 145 parts thereof has the same color strength as 100 parts of Methyl Violet in commercial form.

EXAMPLE 6

An aqueous solution of 200 parts of Victoria Blue R (C.I. No. 44040) is treated in the conventional way with caustic soda solution to form the dye base.

The dye base is filtered off and while still moist is stirred with 87.5 parts of glacial acetic acid at about 60° C. for two to three hours. 250 parts of water is then distilled off at atmospheric or subatmospheric pressure. 75 parts of dipropylene glycol is added to the distillation residue. If desired a small amount (0.2 to 2%) of an anti-foaming agent may be added.

About 450 parts of product is obtained which is still free-flowing at −4° C., which contains no undissolved constituents, which is completely miscible with water and which has a dye content equivalent to 200 parts of Victoria Blue R. The solubility of Victoria Blue R in water at room temperature is less than 0.01%.

EXAMPLE 7

1614 parts of moist Victoria Blue base B (C.I. No. 44045) is stirred with 125 parts of glacial acetic acid at 80° C. 920 parts of water is then distilled off and 155 parts of dipropylene glycol is added to the residue. 970 parts of a mobile dye solution is obtained which has the same dye content as 510 parts of a highly concentrated commercial powder brand.

EXAMPLE 8

The dye base is prepared in the conventional way from a mixture of 250 parts of Ethyl Violet (C.I. No. 42600) and 65 parts of Crystal Violet (C.I. No. 42555) and then 150 parts of dipropylene glycol and 84 parts of glacial acetic acid are added at 50° to 120° C. to the moist press cake. 569 parts of a mobile dye solution which remains liquid down to −14° C. and which has the same dye content as 325 parts of a highly concentrated commercial powder brand.

EXAMPLE 9

300 parts of a 10% caustic soda solution is added to an aqueous solution of 100 parts of Safranine T (C.I. No. 50240) at 75° to 80° C. The precipitated dye base is cooled and filtered off sharply with suction and then reacted with a mixture of 55 parts of propionic acid, 40 parts of glacial acetic acid and 60 parts of ethylene glycol.

255 parts of a concentrated red dye solution is obtained whose color strength is equivalent to that of the initial material.

EXAMPLE 10

100 parts of 10% caustic soda solution is added at about 70° C. to an aqueous of 100 parts of Thioflavine (C.I. No. 49005) while stirring. The orange colored precipitate is filtered off with suction and washed with water until neutral.

The moist dye base is reacted with 50 parts of dipropylene glycol and 40 parts of glacial acetic acid while heating.

255 parts of a concentrated dye solution is obtained; its color strength is equivalent to that of 91 parts of initial material.

EXAMPLE 11

A mixture of 60 parts of dipropylene glycol, 20 parts of methyl glycol and 80 parts of glacial acetic acid is added to 100 parts of dry Auramine base (C.I. No. 41000B) at room temperature. The dye base passes into solution with a yellow color upon stirring.

260 parts of a stable auramine solution is obtained whose color strength does not appreciably decline even upon prolonged standing. 142 parts of the solution has the same color strength as 100 parts of commercial Auramine O.

EXAMPLE 12

520 parts of an about 80% aqueous paste of freshly precipitated dye base of the basic azo dye Vesuvin (C.I. No. 21000) is dissolved in a mixture of 180 parts of glacial acetic acid and 100 parts of the monobutyl ether of diethylene glycol at temperatures below 50° C.

A highly concentrated stable solution of the basic azo dye is obtained having a dye content of about 67%.

EXAMPLE 13

The still moist paste (about 90% dry content) of a dye base obtainable by precipitation from the aqueous solution of 603 parts of Chrysoidine B (C.I. No. 11270) with ammonia solution, is dissolved in a mixture, heated to about 40° to 50° C., of 400 parts of the monobutyl ether of diethylene glycol and 300 parts of 80% lactic acid.

The very stable solution obtained, which is mobile at room temperature, contains about 45% of the basic dye.

EXAMPLE 14

The dye base obtainable by alkaline precipitation from a solution in 40,000 parts of water of a dye having the formula:

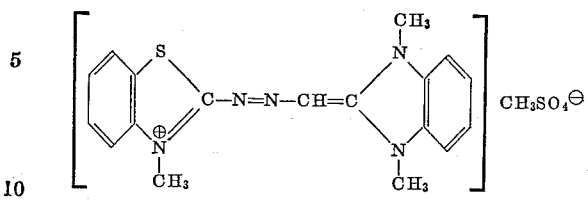

and known from U.S. patent specification 2,913,303 is slowly dissolved at room temperature in a mixture of 660 parts of glacial acetic acid and 340 parts of diethylene glycol.

The solution formed is very stable and may be used for dyeing polyacrylonitrile fibers.

EXAMPLE 15

280 parts of Methyl Violet carbinol base (C.I. No. 42535) is stirred in moist form (with a dry content of about 70 to 71%) at room temperature into a mixture of 80 parts of glacial acetic acid and 100 parts of formamide.

A homogeneous solution is formed after a short time and no solid material separates from it even after prolonged standing. It is stable to frost down to −15° C. 145 parts of this solution has the same color strength and shade as 100 parts of the commercial dye Methyl Violet.

EXAMPLE 16

200 parts of Methyl Violet base (C.I. No. 42535) is introduced at room temperature while stirring into a mixture of 100 parts of N-methylpyrrolidone and 160 parts of 50% aqueous acetic acid. The solution obtained is very stable and even upon prolonged storage at −15° C. shows no sediment or change in concentration whatever. 150 parts is equivalent to 100 parts of Methyl Violet in solid form.

EXAMPLE 17

By following the procedure of Example 15 but replacing the 100 parts of formamide by 100 parts of butyrolactone, a very stable solution of Methyl Violet acetate is obtained having the same color strength as the solution obtainable according to Example 15. It is stable to frost down to at least −15° C.

EXAMPLE 18

200 parts of Rhodamine B base (C.I. No. 45170) is slowly added at 50° to 60° C. while stirring to a mixture of 25 parts of succinic acid, 150 parts of acetonitrile and 100 parts of water. The highly concentrated solution formed is very stable, does not deposit any solid substance even at low temperatures (for example −15° C.) and remains homogeneous. 200 parts has the color strength of 100 parts of commercial Rhodamine B extra in solid form.

EXAMPLE 19

The base obtainable in the conventional way from 25 parts of Chrysoidine B (C.I. No. 11270) by precipitation of the aqueous solution with caustic soda solution is introduced while still moist into a mixture of 10 parts of glacial acetic acid and 15 parts of acetonitrile at 60° C. A stable solution of the basic azo dye is obtained. 200 parts of this solution is equivalent to 100 parts of the commercial dye.

EXAMPLE 20

20 parts of Victoria Blue base B (C.I. No. 44045) is stirred at 60° C. into a mixture of 10 parts of formamide and 16 parts of 50% acetic acid. A stable solution of the dye is obtained of which 160 parts is equivalent to about 100 parts of the commercial dye.

EXAMPLE 21

20 parts of dry Methyl Violet base (C.I. No. 43535) is made into a paste with 16 parts of 50% acetic acid. This mixture is heated to 50° to 60° C. and 10 parts of dimethyl sulfoxide added. A highly concentrated stable dye solution is obtained.

EXAMPLE 22

20 parts of Methyl Violet base (C.I. No. 42535) is introduced into a mixture of 16 parts of 50% acetic acid and 10 parts of tetrahydrofuran and the mixture is heated for some time under reflux. The resultant solution, which can be diluted to an unlimited extent with water, remains stable even at low temperatures.

EXAMPLE 23

The procedure of Example 22 is followed but 10 parts of dioxane is used instead of 10 parts of tetrahydrofuran. A stable concentrated dye solution is obtained of which about 150 to 160 parts is equivalent to 100 parts of commercial Methyl Violet.

EXAMPLE 24

The base is precipitated from an aqueous solution of 20 parts of the red basic azo dye having the formula;

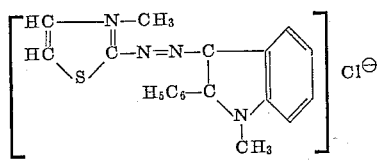

and immediately reacted with 15 parts of glacial acetic acid to form the acetate. After adding 10 parts of dimethylformamide, a concentrated solution is obtained which is stable down to −10° C.

EXAMPLE 25

20 parts of dry Victoria Blue base B (C.I. No. 44045) is dissolved at 60° C. in a mixture of 10 parts of glacial acetic acid and 8 parts of water and the solution is diluted with 10 parts of dimethylformamide, 145 parts of this highly concentrated solution, which remains homogeneous within a wide range of temperatures, has the same color strength as 100 parts of commerical powdered dye.

EXAMPLE 26

134 parts of Auramine O base (C.I. No. 41000B) is ground in a ball mill with 225 parts of formamide for four hours. A mixture of 90 parts of glacial acetic acid and 55 parts of formamide is slowly added to the viscous mass. The mixture is then treated for about another eight hours in a ball mill. The brown liquid mass is freed from undissolved constituents by filtration.

467 parts of a solution having a content of 32.3% of auramine dye is obtained. The residue may be processed into Michler's ketone.

50 parts of formic acid may be used instead of glacial acetic acid and 432 parts of a solution having a dye content of 33.3% is then obtained.

EXAMPLE 27

134 parts of Auramine O base (C.I. No. 41000B) is dissolved in 630 parts of benzene while heating and the solution filtered. A solution of 37 parts of propionic acid and 225 parts of formamide is allowed to flow into the filtrate within about twenty minutes, the temperature thus rising from 33° to 36° C. The whole is further stirred for about twenty minutes, the two layers are separated from each other and the formamide layer is freed from small amounts of benzene under subatmospheric pressure. 375 parts of a dark solution having a dye content of about 41% is thus obtained. The solution may be diluted with water.

EXAMPLE 28

134 parts of Auramine O base (C.I. No. 41000B) is dissolved in 630 parts of benzene while heating. 30 parts of acrylic acid, dissolved in about 40 parts of benzene, is allowed to flow into the filtered solution within fifteen minutes. The temperature thus rises from 31° to 42° C. The product formed begins to separate in yellow crystals even during the introduction of the acrylic acid. The whole is stirred for another hour and the product is filtered off and washed with benzene.

100 parts of the moist product thus obtained is dissolved in 100 parts of formamide at room temperature. A wine red Auramine solution is obtained containing about 47% of dye.

The acrylic acid may also be dissolved in 225 parts of formamide before it is added to the Auramine O base and then, after the layers have been separated, 357 parts of an Auramine solution containing about 42% of dye is obtained.

We claim:

1. A concentrated solution of at least about 20% by weight of a water-soluble aliphatic carboxylic acid salt of a basic dye as formed by the free base of said dye with said acid in a liquid, water-miscible organic solvent selected from the class consisting of ethylene glycol, diethylene glycol, triethylene glycol, dipropylene glycol, 1,2-propylene glycol, 1,4-butanediol and the monomethyl, -ethyl, -propyl and -butyl ethers of said glycols, formamide, dimethyl formamide, N-methylpyrrolidone, butyrolactone, acetonitrile, tetrahydrofurane, dioxane and dimethylsulfoxide.

2. A concentrated solution as claimed in claim 1 which contains water in an amount of up to about 50% by weight, with reference to the total weight of water and said organic solvent.

3. A concentrated solution as claimed in claim 2 which contains water in a ratio of said organic solvent to said water of about 10:1 to 1:1.

4. A concentrated solution of about 20 to 80% by weight, with reference to the solution, of a salt formed between the free base of a basic dye selected from the class consisting of Methyl Violet (C.I. No. 42,535), Victoria Blue R (C.I. No. 44,040), Victoria Blue B (C.I. No. 44,045), Crystal Violet (C.I. No. 42,555), Safranine T (C.I. No. 50,240), Thioflavine (C.I. No. 49,995), Auramine O (C.I. No. 41,000), Vesuvin BA (C.I. No. 21,000), Chrysoidine B (C.I. No. 11,270), Rhodamine B (C.I. No. 45,170), the dye of the formula

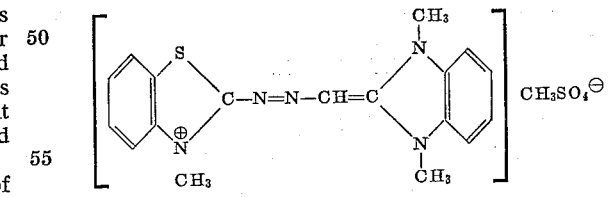

and the dye of the formula

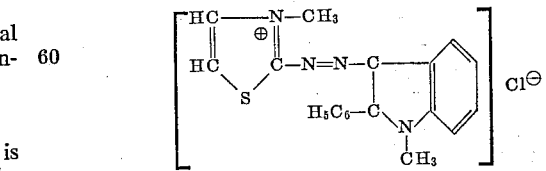

and a water-soluble aliphatic carboxylic acid selected from the class consisting of formic acid, acetic acid, propionic acid, maleic acid, lactic acid, succinic acid and acrylic acid, said water-soluble carboxylic acid being present in an excess of up to the stoichiometric amount, in a liquid consisting of 0 to 50% by weight of water and 50 to 100% by weight of a water-miscible organic solvent selected from the class consisting of ethylene glycol, diethylene glycol, triethylene glycol, dipropylene glycol, 1,2-propylene glycol, 1,4-butanediol and the monomethyl, -ethyl, -propyl and -butyl ethers of said glycols, formamide, dimethylformamide, N-methylpyrrolidone, butyrolactone, acetonitrile, tetrahydrofurane, dioxane and dimethylsulfoxide.

5. A concentrated solution of about 50 to 80% by weight, with reference to the solution, of a salt formed between the free base of Methyl Violet (C.I. No. 42,535) and acetic acid, said acetic acid being present in an excess of up to the stoichiometric amount, in a liquid consisting of 0 to 50% by weight of water and 50 to 100% by weight of a water-miscible organic solvent selected from the class consisting of ethylene glycol, diethylene glycol, triethylene glycol, dipropylene glycol, 1,2-propylene glycol, 1,4-butanediol and the monomethyl, -ethyl, -propyl and -butyl ethers of said glycols, formamide, dimethylformamide, N-methylpyrrolidone, butyrolactone, acetonitrile, tetrahydrofurane, dioxane and dimethylsulfoxide.

6. A concentrated solution of about 50 to 80% by weight, with reference to the solution, of a salt formed between the free base of Rhodamine B (C.I. No. 45,170) and acetic acid, said acetic acid being present in an excess of up to the stoichiometric amount, in a liquid consisting of 0 to 50% by weight of water and 50 to 100% by weight of a water-miscible organic solvent selected from the class consisting of ethylene glycol, diethylene glycol, triethylene glycol, dipropylene glycol, 1,2-propylene glycol, 1-4-butanediol and the monomethyl, -ethyl, -propyl and -butyl ethers of said glycols, formamide, dimethylformamide, N-methylpyrrolidone, butryolactone, acetonitrile, tetrahydrofurane, dioxane and dimethylsulfoxide.

7. A concentrated solution of about 50 to 80% by weight, with reference to the solution, of a salt formed between the free base of Victoria Blue B (C.I. No. 44,045) and acetic acid, said acetic acid being present in an excess of up to the stoichiometric amount, in a liquid consisting of 0 to 50% by weight of water and 50 to 100% by weight of a water-miscible organic solvent selected from the class consisting of ethylene glycol, diethylene glycol, triethylene glycol, dipropylene glycol, 1,2-propylene glycol, 1,4-butanediol and the monomethyl, -ethyl, -propyl and -butyl ethers of said glycols, formamide, dimethylformamide, N-methylpyrrolidone, butyrolactone, acetonitrile, tetrahydrofurane, dioxane and dimethylsulfoxide.

8. A concentrated solution of about 50 to 80% by weight, with reference to the solution, of a salt formed between the free base of Vesuvin BA (C.I. No. 21,000) with acetic acid, said acetic acid being present in an excess of up to the stoichiometric amount, in a liquid consisting of 0 to 50% by weight of water and 50 to 100% by weight of a water-miscible organic solvent selected from the class consisting of ethylene glycol, diethylene glycol, triethylene glycol, dipropylene glycol, 1,2-propylene glycol, 1,4-butanediol and the monomethyl, -ethyl, -propyl and -butyl ethers of said glycols, formamide, dimethylformamide, N - methylpyrrolidone, butyrolactone, acetonitrile, tetrahydrofurane, dioxane and dimethylsulfoxide.

9. A concentrated solution of about 30 to 50% by weight, with reference to the solution, of the dye of the formula:

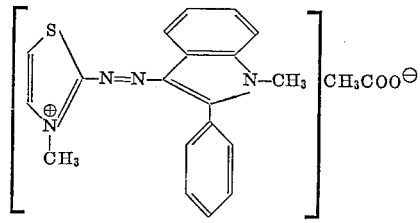

with acetic acid being present in an excess of up to the stoichiometric amount, in a liquid consisting of 0 to 50% by weight of water and 50 to 100% by weight of a water-miscible organic solvent selected from the class consisting of ethylene glycol, diethylene glycol, triethylene glycol, dipropylene glycol, 1,2-propylene glycol, 1,4-butanediol and the monomethyl, -ethyl, -propyl and -butyl ethers of said glycols, formamide, dimethylformamide, N-methylpyrrolidone, butyrolactone, acetonitrile, tetrahydrofurane, dioxane and dimethylsulfoxide.

References Cited

UNITED STATES PATENTS

| | | | |
|---|---|---|---|
| 2,983,651 | 5/1961 | Seemuller | 8—93 |
| 3,019,143 | 1/1962 | Dessauer | 8—85 |
| 3,049,395 | 8/1962 | Conger | 8—93 X |
| 3,070,418 | 12/1962 | Bann | 8—93 |

OTHER REFERENCES

Diserens Chemical Technology of Dyeing and Printing, vol. 2, 1951, pages 92–93, 98–99 and 106–107.

NORMAN G. TORCHIN, *Primary Examiner.*

A. LOUIS MONACELL, *Examiner.*

D. LEVY, T. J. HERBERT, *Assistant Examiners.*

UNITED STATES PATENT OFFICE
CERTIFICATE OF CORRECTION

Patent No. 3,346,322

October 10, 1967

Helmut Finkenauer et al.

It is certified that error appears in the above identified patent and that said Letters Patent are hereby corrected as shown below:

Column 1, line 67, "day" shoud read -- dye --. Column 8, line 45, "49,995" should read -- 49,005 --. Column 9, line 29, "butryolactone" should read -- butyrolactone --.

Signed and sealed this 12th day of August 1969.

(SEAL)
Attest:

Edward M. Fletcher, Jr.
Attesting Officer

WILLIAM E. SCHUYLER, JR.
Commissioner of Patents